UNITED STATES PATENT OFFICE.

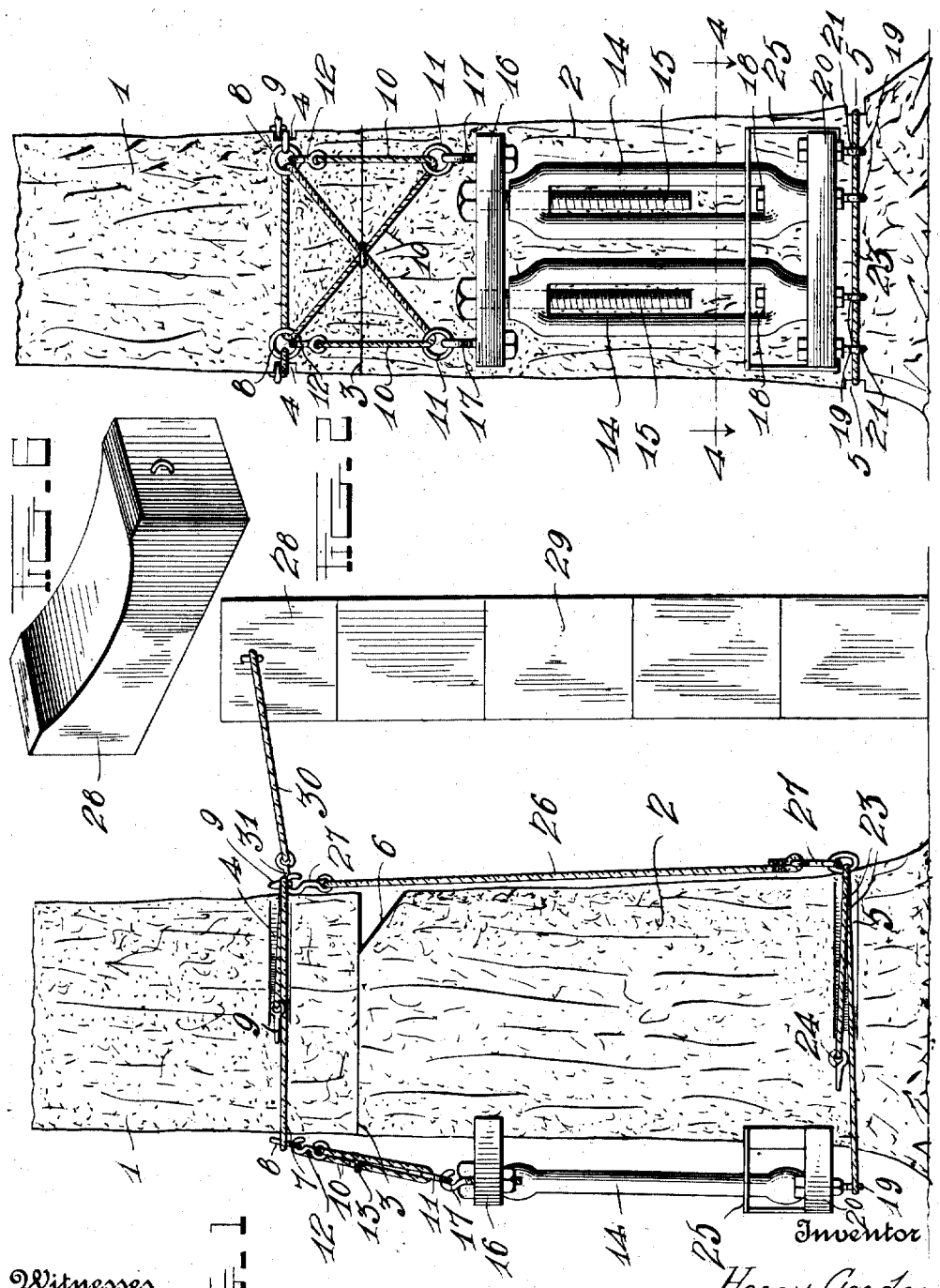

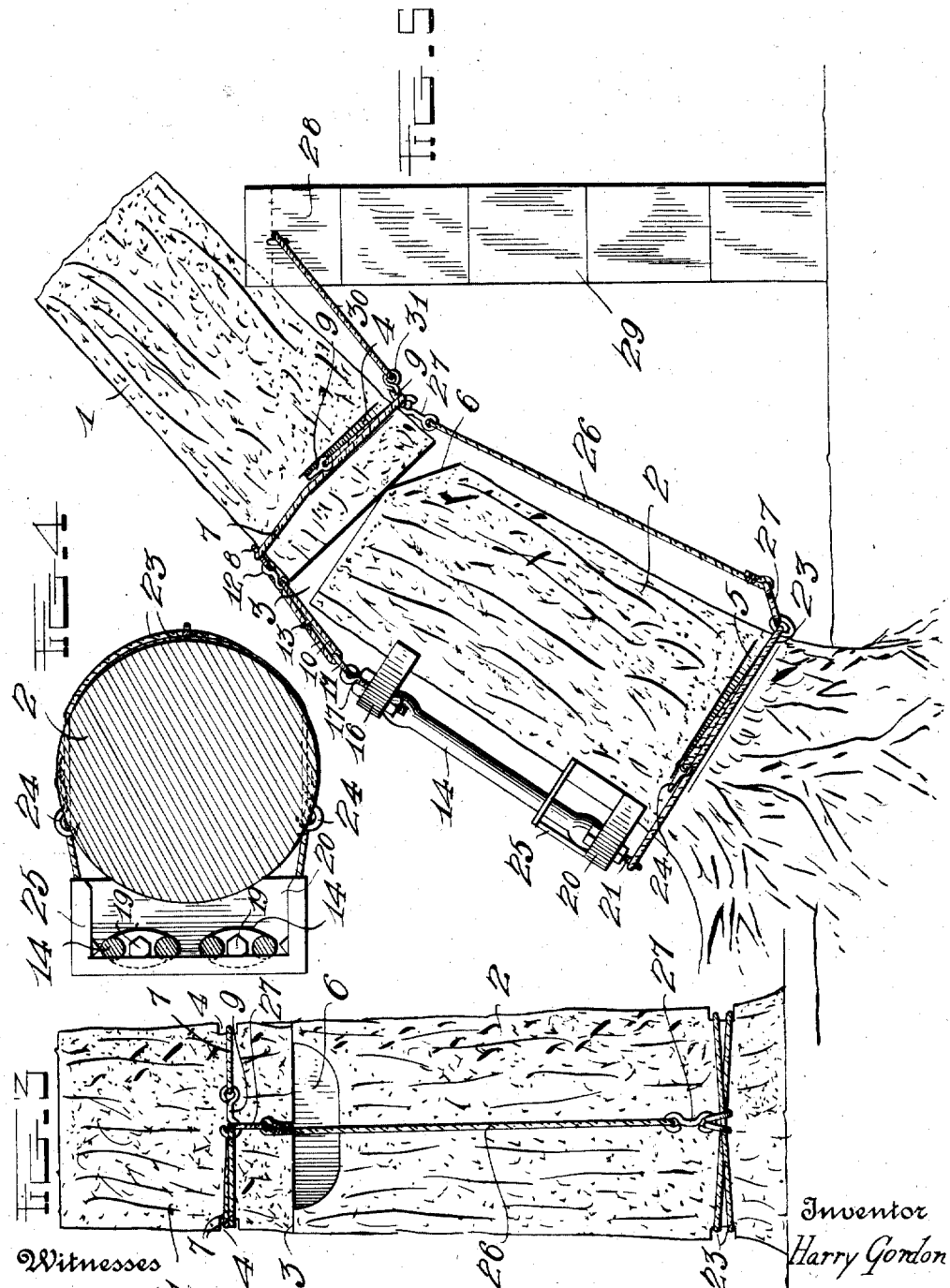

HARRY GORDON, OF BOISE, IDAHO.

STUMP-PULLER.

992,419.　　　Specification of Letters Patent.　Patented May 16, 1911.

Application filed January 3, 1911. Serial No. 600,578.

*To all whom it may concern:*

Be it known that I, HARRY GORDON, a citizen of the United States, residing at Boise, in the county of Ada and State of Idaho, have invented certain new and useful Improvements in Stump-Pullers; and I do declare the following to be a full, clear, and exact description of the invention, such as will enable others skilled in the art to which it appertains to make and use the same.

This invention relates to improvements in stump pullers.

One object of the invention is to provide a stump puller by means of which the power or leverage produced by the falling tree is employed to pull the stump.

Another object is to provide a simple and improved device of this character by means of which trees of any size may be cut off at any desired distance from the ground and felled in any desired direction and the stump thereof readily pulled and elevated a sufficient distance to permit a wagon to be drawn or backed beneath the stump and the latter lowered into the wagon.

With these and other objects in view, the invention consists of certain novel features of construction, combination and arrangement of parts as will be more fully described and particularly pointed out in the appended claims.

In the accompanying drawings:—Figure 1 is a side view of a tree showing the application of the invention thereto, the trunk of the tree having been sawed through at the desired point; Fig. 2 is a similar view at right angles to Fig. 1; Fig. 3 is a similar view of the opposite side of the tree from that shown in Fig. 2; Fig. 4 is a horizontal sectional view on the line 4—4 of Fig. 2; Fig. 5 is a side view similar to Fig. 1 showing the trunk of the tree lowered into engagement with the fulcrum of the device in the act of pulling the stump. Fig. 6 is a perspective view of the fulcrum block.

Referring more particularly to the drawings, 1 denotes the trunk and 2 denotes the stump of the tree to which the device is applied. The trunk of the tree may be sawed at any desired point above the ground, as shown at 3, and is sawed entirely through so that in falling the same is not split up or otherwise damaged.

My improved stump pulling device may be applied to the tree either below or above the cut or, in other words, may be applied to the stump or to the trunk of the tree, the same being shown in the present instance as being applied to the stump below the cut.

In preparing the tree for the reception of the pulling apparatus, the tree is notched in a horizontal plane, as shown at 4, preferably about twelve inches above the saw cut, while the stump is notched near the ground, as shown at 5. The upper end of the stump or at the point of the saw cut, said end of the stump is cut off on a bevel on the side of the tree toward which it is desired to have the trunk fall as shown at 6.

My improved apparatus comprises upper trunk attaching and supporting cables 7 which may be of any suitable length and have connected to one of their ends rings 8 and to their opposite ends hooks 9. Through the rings 8 and the cables 7 is passed a connecting cable 10, the ends of which are crossed and passed through connecting rings 11 and are thence brought upwardly and connected to the rings 8 of the cables 7 by hooks 12 to which the said upper ends of the cables 10 are secured. Where the ends of the cable 10 cross they are preferably secured together by a binding ring or clamp 13.

To the rings 11 are connected turn buckles 14, the upper ends of the screws 15 of which are rigidly secured in an upper supporting plate 16 in which are also arranged hooks 17, said hooks being engaged with the rings 11 thereby supporting the turn buckles 14. The outer portions or loops 18 of the turn buckles have a swiveled connection at their lower ends with hook bolts 19 arranged in a lower supporting plate 20 which corresponds to the upper supporting plate 16. In the plate 20 is also arranged hooks 21. The hooks 19 and 21 project below the plate 20 and are adapted to be engaged with a lower stump attaching cable 23 which may be of any suitable length and is preferably provided on its ends with fastening hooks 24. On the plate 20 is preferably arranged a lever supporting frame 25 which is adapted to serve as a rest for the lever employed in operating the turn buckles.

In applying the apparatus to the tree trunk and stump, the upper cables 7 are passed around the lower portion of the trunk and in engagement with the notches 4 therein as shown. One of the cables 7 is preferably of less length than the other and in applying the cables to the tree or trunk, the longer cable is looped into or engaged with the hook 9 of the shorter cable and said longer cable is then drawn back tightly around the trunk and the hook 9 on the end thereof driven into the tree. The lower cable 23 is securely fastened to the stump by passing the same around the stump into engagement with the notches 5 thereof, the ends of the cable being preferably crossed and brought back around the stump and the hooks 24 thereon driven into the opposite sides of the stump as shown. When the cables 7 and 23 are thus engaged with the tree trunk and stump the turn buckles 14 will be supported in operative position against one side of the stump at a suitable distance below the saw cut in the tree. The cables 7 and 23 when passed around the trunk and stump of the tree are preferably connected together on the opposite side of the stump from the turn buckles by a short connecting cable 26 having on its ends hooks 27, one of which is engaged with the hook 9 on the end of the shorter cable 7 while the hook 27 on the other end of the cable 26 is connected with eyes or links arranged on the lower cable 24 as shown.

When the apparatus has thus been applied to the tree or trunk, the same is adapted to be lowered or tilted over on the upper end of the stump in the desired direction by unscrewing the turn buckles and when the tree trunk is thus tilted, the same will be engaged with a fulcrum block 28 arranged on a supporting base or standard 29 which may be built or constructed of blocks or logs built up upon each other to the desired elevation which is preferably slightly above the saw cut in the tree so that when the trunk is tilted over into engagement with the fulcrum block, said trunk will rest at an inclination of about 45 degrees. The fulcrum block 28 is preferably provided with a concaved or recessed upper surface to receive the trunk of the tree and said block is preferably fastened to the tree trunk by short cables 30 secured at their outer ends to the block and having on their inner ends hooks 31 which are engaged with a link arranged on the hook 9 of the short cable 7. When the trunk of the tree has thus been tilted or let down into engagement with the fulcrum block, the weight of the tree top will be applied through the leverage of the trunk to the stump thereby pulling or extracting the stump. In thus pulling the stump, the latter will be elevated to a sufficient distance to permit a low wagon to be backed or drawn beneath the same so that the elevated stump may be let down into a wagon and removed without handling.

While the apparatus is herein shown and described as being arranged on the stump below the saw cut, which in the present instance is made at a considerable distance above the ground, it will be understood that when it is desired to cut the tree off close to the ground the turn buckle may be applied above the cut and the cables 7 and 10 connected to the lower portion or swivel hooks 19 of the turn buckles and the cable 23 connected to the hooks 17 at the upper end of the turn buckles. When thus arranged, the cable 7 will be attached to the notches 5 in the stump while the cables 23 will be secured in the notches 4 of the tree trunk. In this arrangement, the operation of the apparatus will be the same as described in connection with the first arrangement and the trunk of the tree lowered or tilted into engagement with the fulcrum in the same manner. It will also be understood that when it is simply desired to pull the stump over the fulcrum may be entirely dispensed with.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

Having thus described my invention, what I claim is:—

1. A stump puller comprising in combination a fulcrum erected alongside a tree, a fulcrum between the stump and the severed trunk of the tree, adjustable trunk lowering mechanism, and connections between said mechanism and the stump and severed trunk, respectively, whereby, in falling, the trunk will first tilt on the fulcrum between the stump and trunk and afterward engage the separate fulcrum and thus utilize the weight and leverage of the falling trunk in pulling the stump.

2. In a stump puller, a suitably supported fulcrum block, a plurality of turn buckles, cables adapted to secure the upper end of said turn buckles to the trunk of the tree above the point where the same has been severed from the stump a cable adapted to connect the lower ends of the turn buckles to the stump, whereby when said turn buckles are unscrewed the trunk of the tree will be permitted to tilt into engagement with said fulcrum block and to fall over the same and the leverage produced by the falling tree trunk thereby applied to pull the stump of the tree.

3. In a stump puller, a fulcrum block, means to support said block at the desired elevation, a series of turn buckles, a supporting plate adapted to receive the upper ends of the turn buckle screws, a lower supporting plate, swivel hooks adapted to pivotally connect the lower ends of the turn buckle loops to said lower supporting plate, upper trunk engaging cables adapted to be secured to the trunk of the tree above the point where the same is severed from the stump, a connecting cable to connect said trunk engaging cable with the upper supporting plate of the turn buckles, a lower stump engaging cable adapted to secure said buckles and lower supporting plate to the stump of the tree, a connecting cable adapted to connect said trunk engaging cables on the opposite side of the trunk from said turn buckles, cables adapted to secure said fulcrum block to said trunk engaging cable whereby when the turn buckles are operated, the trunk will be tilted or lowered into engagement with the fulcrum block and the leverage produced by the falling trunk thereby applied to pull the stump and to elevate the same above the ground.

4. In a stump puller, a plurality of turn buckles, supporting plates connected to the upper and lower ends of said turn buckles, a lever supporting frame arranged on the lower supporting plate and adapted to support an operating lever for the turn buckles, cables adapted to be secured to the trunk and stump of the tree, said trunk and stump being notched to receive said cables, means to connect the supporting plates of said turn buckles with said cables, a suitably supported fulcrum block adapted to receive the severed trunk of the tree when the latter is tilted by the operation of said turn buckles, the upper end of the stump being cut off on a bevel on the side of the stump toward which the tree is to fall.

In testimony whereof I have hereunto set my hand in presence of two subscribing witnesses.

HARRY GORDON.

Witnesses:
F. E. WALKER,
RUDOLPH WETTER.

---

Copies of this patent may be obtained for five cents each, by addressing the "Commissioner of Patents, Washington, D. C."